(12) United States Patent
Uesaka et al.

(10) Patent No.: US 11,139,909 B2
(45) Date of Patent: Oct. 5, 2021

(54) EFFECTIVE MASTER INFORMATION BLOCK ACQUISITION FOR A USER EQUIPMENT DEVICE

(71) Applicant: Telefonaktiebolaget LM Ericsson (publ), Stockholm (SE)

(72) Inventors: Kazuyoshi Uesaka, Kanagawa (JP); Muhammad Kazmi, Sundbyberg (SE); Santhan Thangarasa, Vällingby (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 150 days.

(21) Appl. No.: 16/337,767

(22) PCT Filed: Sep. 29, 2017

(86) PCT No.: PCT/SE2017/050953
§ 371 (c)(1),
(2) Date: Mar. 28, 2019

(87) PCT Pub. No.: WO2018/063077
PCT Pub. Date: Apr. 5, 2018

(65) Prior Publication Data
US 2020/0036471 A1     Jan. 30, 2020

Related U.S. Application Data

(60) Provisional application No. 62/402,568, filed on Sep. 30, 2016.

(51) Int. Cl.
*H04L 1/00*     (2006.01)
*H04W 76/11*    (2018.01)
(Continued)

(52) U.S. Cl.
CPC ............ *H04L 1/0026* (2013.01); *H04L 5/006* (2013.01); *H04L 5/0082* (2013.01); *H04W 4/06* (2013.01);
(Continued)

(58) Field of Classification Search
CPC .... H04L 1/0026; H04L 5/0082; H04W 76/11; H04W 76/27; H04W 36/0007; H04W 4/06; H04W 36/08
See application file for complete search history.

(56) References Cited

U.S. PATENT DOCUMENTS

2010/0223524 A1    9/2010 Duggan et al.
2014/0051426 A1*   2/2014 Siomina ............ H04W 36/0088
                                                    455/422.1
(Continued)

FOREIGN PATENT DOCUMENTS

EP    0 986 280 A2    3/2000
WO    2016 144495 A1  9/2016

OTHER PUBLICATIONS

3GPP TSG RAN WG1 Meeting #81; Fukuoka, Japan; Source: NTT Docomo; Title: Views on SIB design in Rel-13 low complexity MTC (R1-153327)—May 25-29, 2015.
(Continued)

*Primary Examiner* — Eric Myers
(74) *Attorney, Agent, or Firm* — Christopher & Weisberg, P.A.

(57) ABSTRACT

According to certain embodiments, a user equipment (UE) (110), comprises an interface (710) configured to receive one or more symbols at the start of a first transmission time interval (TTI) of a channel. The UE further comprises processing circuitry (720) operably coupled to the interface (710). The processing circuitry (720) configured to obtain a signal quality estimate based on at least one of the one or more symbols; compare the signal quality estimate to a signal quality threshold; and determine, based on the comparison, whether to process the channel in the first TTI.

24 Claims, 9 Drawing Sheets

(51) Int. Cl.
  *H04W 76/27* (2018.01)
  *H04W 36/00* (2009.01)
  *H04L 5/00* (2006.01)
  *H04W 4/06* (2009.01)
  *H04W 36/08* (2009.01)

(52) U.S. Cl.
  CPC ....... *H04W 36/0007* (2018.08); *H04W 36/08* (2013.01); *H04W 76/11* (2018.02); *H04W 76/27* (2018.02)

(56) References Cited

U.S. PATENT DOCUMENTS

2015/0230136 A1   8/2015  Su et al.
2020/0022067 A1*  1/2020  Pan ..................... H04W 48/14

OTHER PUBLICATIONS

Extended European Search Report issued for Application No./Patent No. 17856911.7-1212 / 3520488 PCT/SE2017050953—dated Mar. 3, 2020.

Inbound Mobility From Geran to HNB; 3GPP TSG Geran #43; Vancouver, Canada; Source Huawei Technologies Co., Ltd (Tdoc GP-091192)—Aug. 31-Sep. 4, 2009.

Reading MIB/SIB for Inbound Mobility to CSG; 3GPP TSG Geran WG1 ad hoc;Sophia Antipolis, France; Source; Huawei Technologies Co., Ltd (TDoc AHG1-090010)—Oct. 19-21, 2009.

PCT International Search Report for International application No. PCT/SE2017/050953—dated Feb. 16, 2018.

PCT Written Opinion of the International Searching Authority for International application No. PCT/SE2017/050953—dated Feb. 16, 2018.

* cited by examiner

EFFECTIVE MASTER INFORMATION BLOCK ACQUISITION FOR A USER EQUIPMENT DEVICE

PRIORITY

This nonprovisional application is a U.S. National Stage Filing under 35 U.S.C. § 371 of International Patent Application Serial No. PCT/SE2017/050953 filed Sep. 29, 2017 and entitled "Effective Master Information Block Acquisition for A User Equipment Device" which claims priority to U.S. Provisional Patent Application No. 62/402,568 filed Sep. 30, 2016 both of which are hereby incorporated by reference in their entirety.

TECHNICAL FIELD

The present disclosure relates, in general, to wireless communications and, more particularly, to effective master information block (MIB) acquisition for a user equipment (UE) device.

BACKGROUND

Master Information Block

Long Term Evolution (LTE) base stations (BS) broadcast the Master Information Block (MIB) on the physical broadcast channel (PBCH) in order to inform a limited number of the system information that is essential for initial access to the network by user equipment (UE). This system information includes, for example, LTE system bandwidth (e.g., 1.4 MHz, 10 MHz), the current system frame number (SFN), and the scheduling system information block 1 (SIB1). Once UE acquire the cell ID and subframe boundary from the Primary Synchronization Signal (PSS)/Secondary Synchronization Signal (SSS), the UE try to decode PBCH to acquire the MIB. In Release 8 LTE, PBCH is transmitted on subframe 0 with the central 72 resource elements, and MIB is transmitted over a period of 40 ms (i.e., 1 Transmission Time Interval (TTI)). To acquire the MIB, UE receive PBCH symbols on subframe 0 every subframe and decode it every 40 ms. After the MIB acquisition, UE know the system bandwidth up to 20 MHz and also know the scheduling information to acquire SIB1. Since UE cannot access the network without MIB, UE should continue to receive and decode until acquisition.

Machine-Type Communication

Machine-to-machine (M2M) communication (also known as machine-type communication (MTC)) is used for establishing communication between devices and between devices and humans. The communication may, for example, include exchange of data, signaling, measurement data, configuration information, and other suitable types of communication. The device size may vary from that of a wallet to that of a base station. M2M devices are quite often used for applications like sensing environmental conditions (e.g., temperature reading), metering or measurement (e.g., electricity usage, etc.), fault finding, error detection, and other suitable applications. In these applications, the M2M devices might be installed in a poor signal area, such as in a basement level. Third Generation Partnership Project (3GPP) Release 13 has modified the PBCH scheduling for enhanced MTC (eMTC) so that an M2M device can acquire MIB even if it is in poor signal area. In Release 13, an eNodeB (eNB) can transmit 5 times of PBCH symbols compared with legacy Release 8 LTE.

FIG. 1 illustrates a simulation result of PBCH demodulation. More particularly, FIG. 1 illustrates a simulation result of PBCH demodulation where PBCH repetition is enabled according to 3GPP Release 13 TS 36.211. In FIG. 1, block error rate (BLER) is given by the PBCH decoding error rate over MIB acquisition window, where the size of the acquisition window is defined as W×PBCH TTI length. For eMTC, PBCH TTI is 40 ms. W=1 means that PBCH BLER is evaluated every 40 ms. W=4 means UE have a chance to decode PBCH 4 times independently, and PBCH BLER is evaluated every 160 ms (4×40 ms). If the target PBCH BLER is 0.1 (10%) and 40 ms MIB acquisition time, UE need to be located at SNR>−10 dB. However, if a UE is located at very weak signal to noise ratio (SNR) area (e.g., SNR=−14 dB), the UE needs 320 ms (8×40 ms=320 ms) to acquire MIB with 90% of probability.

3GPP Release 13 has also introduced support for the repeated transmission of channels for control channel (MPDCCH) and data channel (Physical Downlink Shared Channel (PDSCH)) so that UE on the coverage extension area can receive the data from the network node. The repetition operation simply transmits the same symbol with the repetition number. To receive the repeated data, UE accumulate the symbols until the specified repetition number is reached, and then try to decode the channel. For MPDCCH repetition number, the network node informs the maximum repetition number to UEs on the system information, but the actual repetition number may be smaller than the informed repetition number. In the 3GPP specification, there are up to 4 possible repetition numbers. The network node can select one of them according to the UE conditions, such as their SNR levels or channel condition. For PDSCH repetition number, it is signaled on the downlink (DL) scheduling message on the control channel (MPDCCH).

Narrow Band Internet of Things

The Narrow Band Internet of Things (NB-IoT) is a radio access for cellular internet of things (JOT), based to a great extent on a non-backward-compatible variant of Evolved-Universal Terrestrial Radio Access (E-UTRA), which addresses improved indoor coverage, support for a massive number of low-throughput devices, low delay sensitivity, ultra-low device cost, low device power consumption and optimized network architecture. Although the system bandwidth of NB-IoT is only 200 kHz, NB-IoT systems also have master information block (MIB-NB). The MIB-NB is transmitted on a NB-IoT physical broadcast channel (NPBCH). Unlink E-UTRA, MIB-NB is transmitted over 640 ms, where NPBCH is transmitted on subframe 0 every radio frame.

FIG. 2 illustrates simulation results of MIB-NB acquisition probability. Similar to FIG. 1, ib-1 means the NPBCH decoding rate is evaluated over 1 TTI (640 ms). In the case of ib-4, UE can try to decode 4 times independently (4×640 ms=2560 ms). As shown in FIG. 2, if one considers 640 ms MIB-NB acquisition time, SNR>−11 dB in order to achieve BLER=0.1 (10%) or less. If a UE is located at an area with SNR=−12 dB, MIB-NB acquisition time is 1280 ms (2×640 ms=1280 ms) to secure BLER=0.1 or less.

FIGS. 1 and 2 show that the current PBCH/NPBCH design allows longer acquisition time than the TTI. A UE should try to receive and decode PBCH/NPBCH several times until it is successful. 3GPP Release 13 has also introduced support for the repeated transmission of channels for control channel (e.g., NPDCCH) and data channel (e.g., NPDSCH) so that UE on the coverage extension area can receive the data from the network node. The repetition operation simply transmits the same symbol with the repetition number. To receive the repeated data, UE accumulate the symbols until the specified repetition number is reached, and then try to decode the channel. For NPDCCH repetition number, the network node informs the maximum repetition number to UEs on the system information, but the actual repetition number may be smaller than the informed repetition number. In the 3GPP specification, there are up to 4 possible repetition numbers. The network node can select one of them according to the UE condition, such as their SNR levels or channel condition. For NPDSCH repetition number, it is signaled on the DL scheduling message on the control channel (NPDCCH).

SUMMARY

To address the foregoing problems, disclosed is a method in a user equipment (UE). The method includes receiving one or more symbols at the start of a first transmission time interval (TTI) of a channel. The method includes obtaining a signal quality estimate based on at least one of the one or more symbols and comparing the signal quality estimate to a signal quality threshold. The method may then determine, based on the comparison, whether to process the channel in the first TTI. In some embodiments, prior to receiving the one or more symbols, the method further includes receiving a request to perform one or more operations related to the channel within a time period, the time period comprising at least two TTIs of the channel. In some embodiments, the channel may be a broadcast channel.

In some embodiments, determining, based on the comparison, whether to process the channel in the first TTI includes processing the channel in the first TTI if the signal quality estimate is greater than the signal quality threshold and skip processing the channel in the first TTI if the signal quality estimate is lower than the signal quality threshold.

In some embodiments, the one or more operations related to the channel comprise one or more of: receiving one or more of information, data, and control information over the channel; acquiring a cell global identifier (CGI); acquiring a master information block (MIB); acquiring a master information block narrowband (MIB-NB); acquiring a broadcast channel of a target cell during a cell change procedure; and acquiring a broadcast channel of a serving cell.

In some embodiments, the request to perform one or more operations related to the channel within the time period comprises at least one of: an internal request received in the UE through a higher layer; and an external request received from a network node. In some embodiments, the external request comprises downlink control information (DCI) received from the network node, the DCI comprising a scheduling grant.

In certain embodiments, the signal quality threshold is adaptable based on one or more of a battery life of the UE; a type of the channel received by the UE; a time period during which the UE is required to successfully receive the channel; and a type of operation of the UE. In some embodiments, the type of operation of the UE comprises one of: a cell change; an initial cell selection; a paging reception; a cell reselection; a radio resource control (RRC) re-establishment; a RRC connection release with redirection; and a CGI reading.

In certain embodiments, the signal quality estimate comprises one of a signal-to-noise ratio (SNR); a signal-to-interference plus noise ratio (SINR); a reference signal received quality (RSRQ); and a block error rate (BLER).

In certain embodiments, processing the channel includes at least one of: decoding the channel; continuing reception of the channel; storing the received symbol data in a buffer; acquiring a MIB; and acquiring a MIB-NB.

In certain embodiments, obtaining a signal quality estimate of the one or more symbols comprises measuring the signal quality of the one or more symbols.

Also disclosed is a UE comprising an interface and processing circuitry, the interface and processing circuitry are operably coupled. The interface is configured to receive one or more symbols at the start of a first transmission time interval (TTI) of a channel. The processing circuitry may be configured to obtain a signal quality estimate based on at least one of the one or more symbols, compare the signal quality estimate to a signal quality threshold, and determine, based on the comparison, whether to process the channel in the first TTI. In some embodiments, the channel is a broadcast channel. In certain embodiments, prior to receiving the one or more symbols, the interface is further configured to receive a request to perform one or more operations related to the channel within a time period, the time period comprising at least two TTIs of the channel.

In some embodiments, to determine, based on the comparison, whether to process the channel in the first TTI, the processing circuitry is configured to process the channel in the first TTI if the signal quality estimate is greater than the signal quality threshold and not process the channel in the first TTI if the signal quality estimate is lower than the signal quality threshold.

In some embodiments, the one or more operations related to the channel comprises one or more of: receive, via the interface, one or more of information, data, and control information over the channel; acquire, via the interface, a cell global identifier (CGI); acquire, via the interface, a master information block (MIB) acquire, via the interface a master information block narrowband (MIB-NB); acquire, via the interface, a broadcast channel of a target cell during a cell change procedure; and acquire, via the interface, a broadcast channel of a serving cell.

In some embodiments, the request to perform one or more operations related to the channel within the time period comprises at least one of: an internal request received in the UE through a higher layer and an external request received from a network node. In some embodiments, the external request comprises downlink control information (DCI) received from the network node, the DCI comprising a scheduling grant.

In some embodiments, the signal quality threshold is adaptable based on one or more of: a battery life of the UE; a type of the channel received by the UE; a time period during which the UE is required to successfully receive the channel; and a type of operation of the UE. In some embodiments, the type of operation of the UE includes one of: a cell change; an initial cell selection; a paging reception; a cell reselection; a radio resource control (RRC) re-establishment; a RRC connection release with redirection; and a CGI reading.

In some embodiments, the estimated signal quality comprises one of: a signal-to-noise ratio (SNR), a signal-to-interference plus noise ratio (SINR), a reference signal received quality (RSRQ), and a block error rate (BLER).

In some embodiments, processing the channel comprises at least one of: decoding the channel; continuing reception of the channel; storing the received symbol data in a buffer; and acquiring a MIB; and acquiring a MB-NB.

In some embodiments, obtaining a signal quality estimate of the one or more symbols comprises measuring the signal quality of the one or more symbols.

Certain embodiments of the present disclosure may provide one or more technical advantages. As one example, certain embodiments may advantageously allow a UE to acquire MIB/MIB-NB with power efficiently. As another example, certain embodiments may advantageously reduce the UE power consumption at MIB/MIB-NB acquisition. As still another example, certain embodiments may advantageously decrease UE processing and require the UE to implement more economical processing capability. This is particularly useful for low cost MTC devices. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
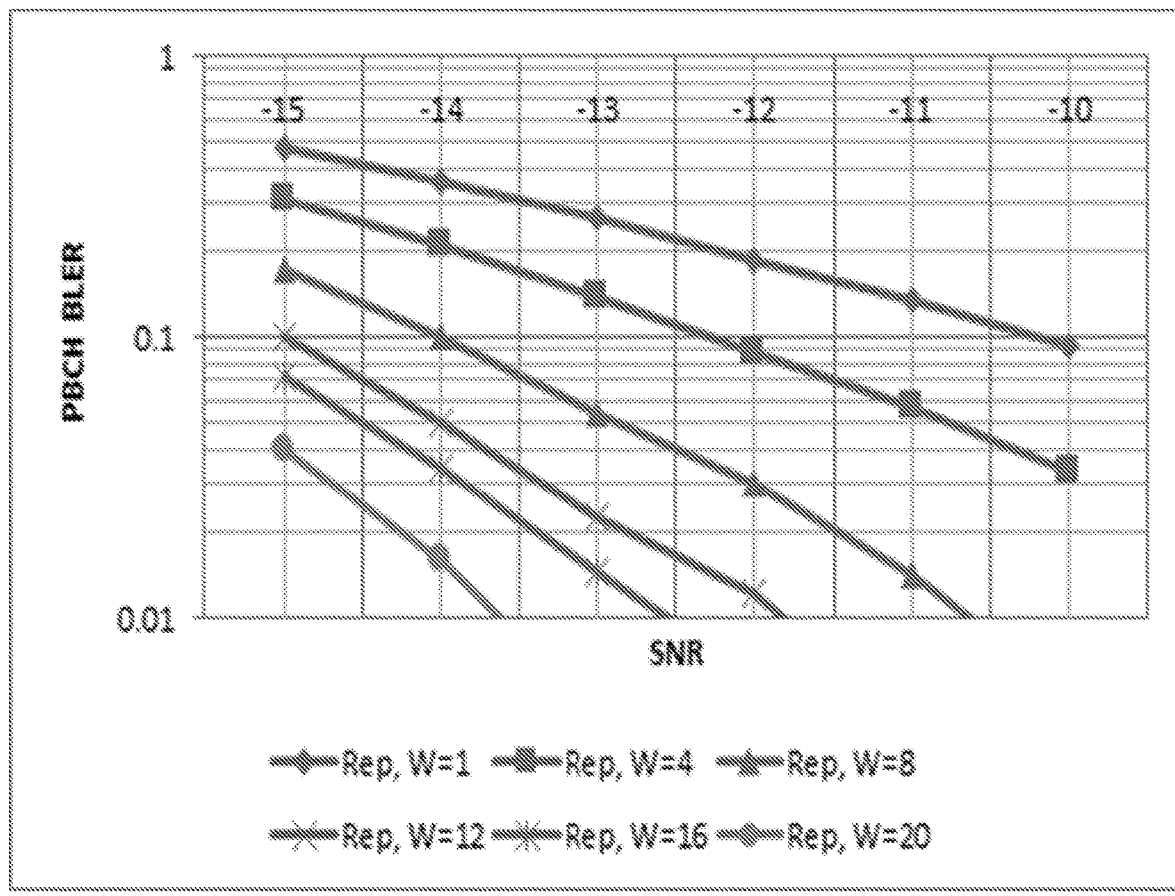
FIG. 1 illustrates a simulation result of PBCH demodulation.
Figure 2:
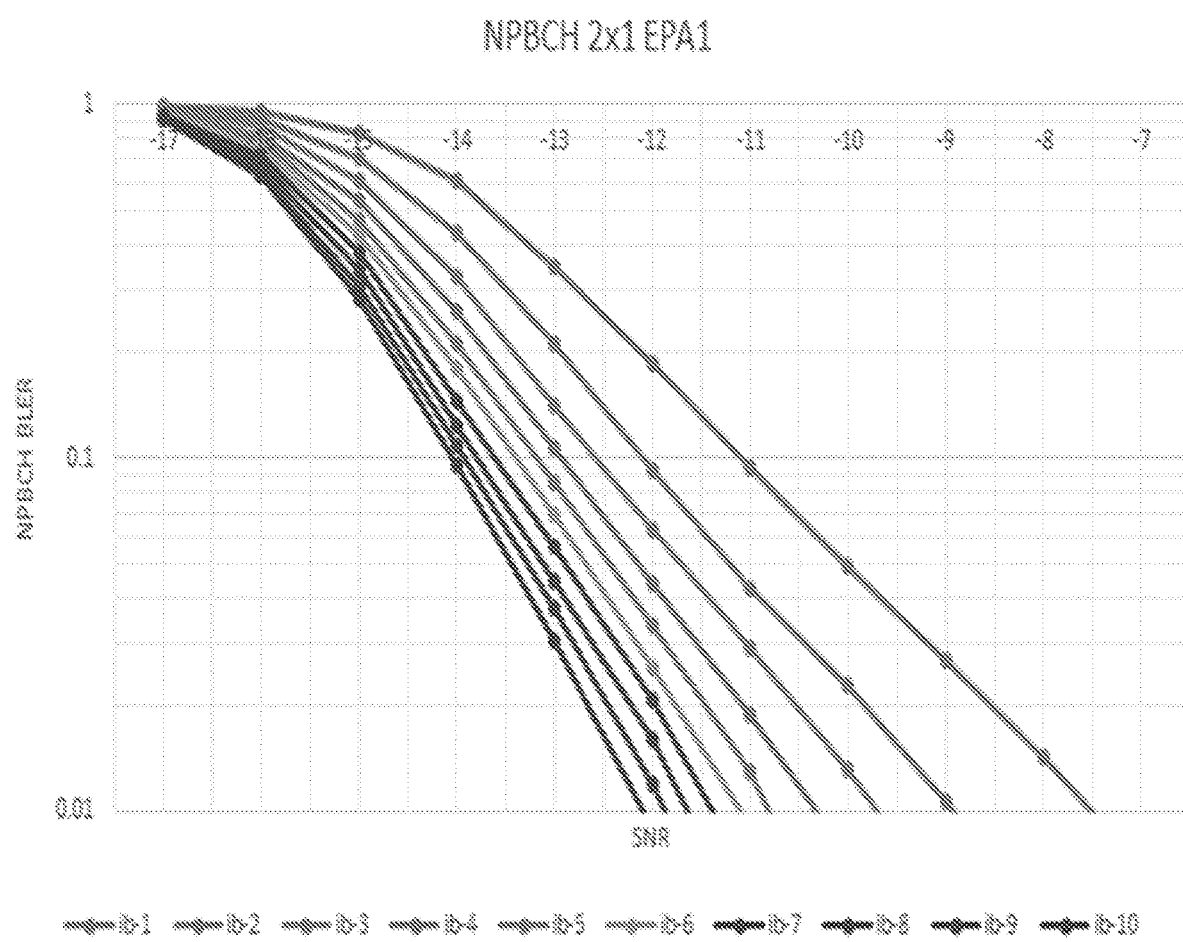
FIG. 2 illustrates a simulation result of MIB-NB acquisition probability.

As described above, the current PBCH/NPBCH design allows longer acquisition time than the TTI. A UE needs to try to receive and decode PBCH/NPBCH several times until it is successful. Longer allowed acquisition time for MIB for MTC (or MIB-NB for NB-IoT) means the coding rate or repetition for PBCH/NPBCH might not be sufficient to decode these channels with one decoding attempt in the low SNR area, or coverage extension area. In such a case, a UE may be required to receive and decode PBCH/NPBCH many times until it is decoded successfully.

Receiving and decoding PBCH/NPBCH many times presents a number of technical issues, especially for MTC/NB-IoT devices, because some MTC/NB-IoT devices only need to transmit/receive a few bytes of data per day, and such little data transmission/reception takes a 100~1,000 ms. Yet, as explained above, MIB acquisition needs 320 ms and MIB-NB acquisition needs 1,280 ms. This means UE need to additionally activate radio frequency (RF) and baseband processor at least 320/1,280 ms to acquire the system information in order to transmit/receive a few bytes of data. This has a huge impact for MTC/NB-IoT modules with low power consumption requirements. For instance, some UE devices should operate for more than 10 years using two AA batteries.

The present disclosure contemplates various embodiments that may address these and other deficiencies. Since the broadcast channel (e.g., PBCH/NPBCH) symbols are transmitted every TTI, a UE cannot reuse the broadcast channel (e.g., PBCH/NPBCH) symbols received in the previous TTI (i.e., the UE cannot combine broadcast symbols received in different TTIs). Therefore, in certain embodiments the UE adaptively decides the TTIs during which the UE will receive and decode the broadcast channel, and may skip the reception of the broadcast channel in other TTIs. The adaptive decision may be based on one or more criteria. For example, in certain embodiments the decision may be based on radio conditions, UE battery life, target BLER, type of operation, available resources in the UE (e.g., memory, processor, etc.), type of channels, etc. For example, the UE may adaptively skip the broadcast channel (e.g., PBCH/NPBCH) reception and/or decoding if the channel condition is poor (e.g., SNR is below a certain threshold). This is because under poor channel condition it is expected that the broadcast channel will result in decoding failure. This may advantageously enable the UE to reduce power consumption and/or processing.

According to one example embodiment, this is achieved by a method in a UE. The UE obtains a request to receive a channel (e.g., broadcast channel) in a cell within a certain time period (T0) comprising of at least two TTIs of the channel (e.g. broadcast channel). The UE starts receiving the channel (e.g., broadcast channel such as PBCH/NPBCH) from the start of its TTI in the cell. The UE estimates signal quality (Q) of the signal received from the cell, and compares the signal quality with a signal quality threshold (Qh). The UE determines, based on the comparison of the signal quality (Q) with the signal quality threshold (Qh) whether or not to continue receiving the channel (e.g., broadcast channel) in the current TTI of the channel (e.g., broadcast channel). In some cases, the UE may receive the channel (e.g., broadcast channel) in the current TTI if Q>Qh.

These and other embodiments described herein may provide one or more technical advantages. As one example, certain embodiments may advantageously reduce the UE power consumption at MIB/MIB-NB acquisition. As another example, certain embodiments may advantageously decrease UE processing and require the UE to implement more economical processing capability. This is particularly useful for low cost MTC devices. Other advantages may be readily apparent to one having skill in the art. Certain embodiments may have none, some, or all of the recited advantages.

Figure 3:
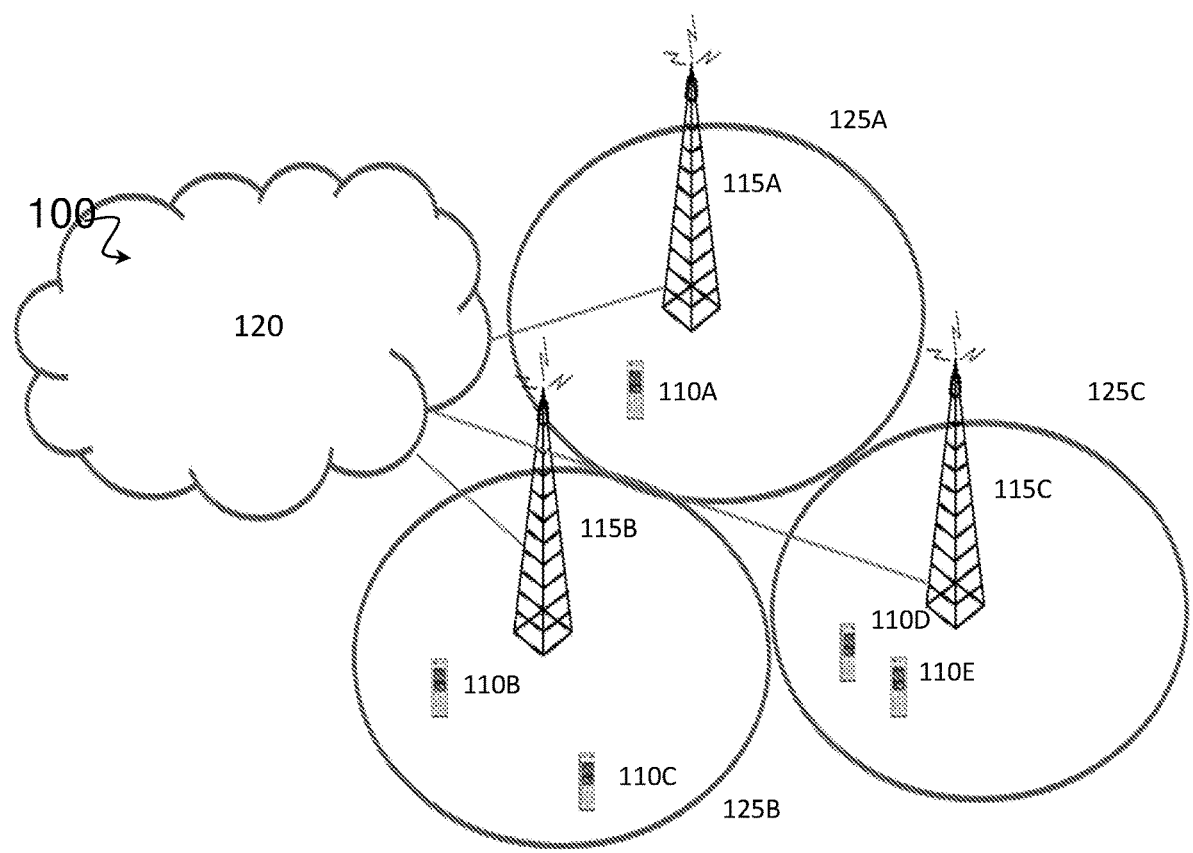
FIG. 3 is a schematic diagram of a wireless communication network, in accordance with certain embodiments.

FIG. 3 is a schematic diagram of a wireless communication network 100, in accordance with certain embodiments. Network 100 includes one or more UE(s) 110 (which may be interchangeably referred to as wireless devices 110, IoT device 110, NB-IoT device 110, or simply device 110) and network node(s) 115 (which may be interchangeably referred to as eNodeBs (eNBs) 115, gNodeBs (gNBs) 115, or simply node 115). More particularly, FIG. 3 illustrates a plurality of UEs 110A-110E and a plurality of network nodes 115A-C.

UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information.

In some embodiments, an area of wireless signal coverage associated with a network node 115 may be referred to as a cell 125. In the example of FIG. 3, the area of wireless signal coverage associated with network node 115A is cell 125A, the area of wireless signal coverage associated with network node 115B is cell 125B, and the area of wireless signal coverage associated with network node 115C is cell 125C. Although the example of FIG. 3 shows a single cell 125 associated with each network node 115, the present disclosure contemplates that each network node 115 may have any suitable number of cells 125 associated with it. In some embodiments, UEs 110 may have D2D capability. Thus, UEs 110 may be able to receive signals from and/or transmit signals directly to another UE. For example, UE 110B may be able to receive signals from and/or transmit signals to UE 110C.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be performed by network node 115. The radio network controller may interface with a core network node. In certain embodiments, the radio network controller may interface with the core network node via interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

In some embodiments, the non-limiting term "UE" is used. As described above, example embodiments of network 100 may include one or more UEs 110, and one or more different types of network nodes 115 capable of communicating (directly or indirectly) with UEs 110. UEs 110 described herein can be any type of wireless device capable of communicating with network nodes 115 or another UE 110 over radio signals. UE 110 may also be a radio communication device, target device, device-to-device (D2D) UE, machine-type-communication UE or UE capable of machine to machine communication (M2M), a low-cost and/or low-complexity UE, a sensor/actuator equipped with UE, tablet, mobile terminal, smart phone, laptop embedded equipment (LEE), laptop mounted equipment (LME), USB dongles, Customer Premises Equipment (CPE), an IoT device, a NB-IoT device, or any other suitable device.

Also, in some embodiments non-limiting generic terminology "radio network node" or "network node" is used. It can be any kind of radio network node or any network node that communicates with a UE and/or with another network node. Examples of network nodes are a Node B, MeNB, SeNB, a network node belonging to MCG or SCG, base station (BS), radio base station, multi-standard radio (MSR) radio node such as MSR BS, eNode B, network controller, radio network controller (RNC), multi-cell/multicast coordination entity (MCE), base station controller (BSC), relay node, donor node controlling relay, base transceiver station (BTS), access point (AP), radio access point, transmission points, transmission nodes, remote radio unit (RRU), remote radio head (RRH), nodes in distributed antenna system (DAS), core network node (e.g. MSC, MME, SON node, coordinating node, etc.), O&M, OSS, positioning node (e.g. E-SMLC), MDT, an external node (e.g., third-party node, a node external to the current network), or any suitable network node.

Example embodiments of UEs 110, network nodes 115, and other network nodes (such as radio network controller or core network node) are described in more detail with respect to FIGS. 7-11 below.

Although FIG. 3 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs 110 or between a UE 110A and another communication device (such as a landline telephone). Furthermore, although certain embodiments may be described as implemented in an LTE network, the embodiments may be implemented in any appropriate type of telecommunication system supporting any suitable communication standards and using any suitable components, and are applicable to any RAT or multi-RAT systems in which the UE 110 receives and/or transmits signals (e.g., data). For example, the various embodiments described herein may be applicable to IoT, NB-IoT, LTE, LTE-Advanced, 5G, new radio (NR), UMTS, HSPA, GSM, cdma2000, WiMax, WiFi, another suitable radio access technology, or any suitable combination of one or more radio access technologies.

In some embodiments, the UE 110 may be configured with Primary Cell (PCell) and Primary Secondary Cell (PSCell) or with PCell, PSCell and one or more Secondary Cells (SCells) such as in carrier aggregation (CA) or dual connectivity (DC). The configured cells are UE 110 specific (also known as serving cells of the UE 110). There may be one or more UEs 110 in a cell. The various embodiments described herein are applicable to a UE 110A in a high activity state (e.g., RRC CONNECTED state, active mode etc.).

A physical signal comprises of a set of resource elements used by the physical layer but does not carry information originating from higher layers. Examples of downlink physical signals are Cell-Specific Reference Signal (CRS), Reference Signal (RS), Primary Synchronization Signal (PSS), Secondary Synchronization Signal (SSS), Extended Synchronization Signal (ESS), Channel State Information Reference Signal (CSI-RS), Demodulation Reference Signal (DMRS), Positioning Reference Signal (PRS), Multicast-Broadcast Single-Frequency Network Reference Signal (MBSFN RS), Narrowband PSS (NPSS), Narrowband SSS (NSSS), Narrowband Reference Signal (NRS), among others.

A physical channel comprises a set of resource elements carrying information originating from higher layers (e.g., transport channel, RRC message, etc.). Examples of downlink physical channels are Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid ARQ Indicator Channel (PHICH), Enhanced Physical Downlink Control Channel (EPDCCH), MPDCCH, NPDCCH, NPDSCH, NPBCH etc. System information such as system information broadcast (SIB1bis) may also be transmitted over physical channels such as PDSCH, NPSDCH, or other suitable physical channels.

As used herein, the term time resource may correspond to any type of physical resource or radio resource expressed in terms of length of time. Examples of time resources include, but are not limited to: symbol, time slot, subframe, radio frame, TTI, interleaving time, special subframe, and UpPTS.

As used herein, the term repetition of a signal/channel may refer to transmitting at least two identically transmitted signals in different time resources (e.g., in different subframes). Examples of signals include, but are not limited to, physical signals (e.g., CRS, PSS, SSS, NRS, NPSS, NSSS, etc.) and physical channels (e.g., PDCCH, ePDCCH, NPDCCH, MPDCCH, NPDSCH, PDSCH, PBCH, NPBCH, PUCCH, PUSCH, NPUCCH, NPUSCH, etc.). The radio node (e.g., UE 110 or network node 115) decodes the channel (e.g., MPDCCH) transmitted with repetition after receiving first transmission of the channel and one or more retransmissions of the same channel (as described above with respect to eMTC, FeMTC and NB-IoT UEs). The repetition of a signal may be interchangeably referred to as "multi-shot transmission" of a signal, transmission of signal with repetition, transmission of signal in multiple time resources, control channel repetition, multiple transmissions of a signal, signal repetitions, number of signal repetition, etc. Typically, the "multi-shot reception" or reception of signal transmitted with repetition is performed by the radio node after receiving multiple transmissions of the same signal from another radio node in consecutive time resources (e.g., over X consecutive DL subframes, where the DL subframes are configured by the network node 115 and may be indicated to the UE 110 via signaling).

The UE 110 may operate under either normal coverage or enhanced coverage with respect to its serving cell. Enhanced coverage may be interchangeably referred to as extended coverage. The UE 110 may also operate in a plurality of coverage levels, for example normal coverage, enhanced coverage level 1, enhanced coverage level 2, enhanced coverage level 3 and so on.

The coverage level may be expressed in any suitable manner. For example, in certain embodiments the coverage level may be expressed in terms of: received signal quality and/or received signal strength at the UE 110 with respect to a cell 125 and/or received signal quality and/or received signal strength at the cell 125 with respect to the UE 110. Examples of cell 125 include, but are not limited to, serving cell 125A of the UE 110A, neighbor cell 125B of the UE 110A, a reference cell, or other suitable cells. Examples of signal quality include, but are not limited to, Signal to Noise Ratio (SNR), Signal to Interference Plus Noise Ratio (SINR), Channel Quality Indicator (CQI), Reference Signal Received Quality (RSRQ), and Es/Iot. Examples of signal strength include, but are not limited to, path loss, Reference Signal Received Power (RSRP) etc. Consider an example of 2 coverage levels defined with respect to signal quality (e.g., SNR) at the UE 110 comprising of:

Coverage enhancement level 1 (CE1) comprising of $SNR \geq -6$ dB at UE with respect to its serving cell; and Coverage enhancement level 2 (CE2) comprising of $-12$ dB$\leq$SNR$<-6$ dB at UE with respect to its serving cell.

Effective MIB Acquisition

To effectively acquire the MIB according to embodiments of the present disclosure, the UE 110 may perform one or more of the following steps. The steps will first be described generally and then each step will be described in greater detail.

Step 1: Obtaining a request to receive a channel (e.g., broadcast channel such as PBCH/NPBCH) of a cell 125 within a certain time period (T0) comprising of at least two TTIs of the channel. The UE 110 may obtain the request in any suitable manner. As one example, the UE 110 may obtain the request by receiving a request from the network node 115. As another example, the UE 110 may obtain the request internally in the UE 110 through higher layer.

Step 2: For every channel TTI start timing, UE 110 may start to receive channel symbols.

Step 3: During the reception, the UE 110 may measure the quality of the received channel symbols or the quality of the other channels such as reference symbols.

Step 4: If the measured quality is smaller than a threshold, the UE 110 may stop the channel reception until the start of next channel start timing. The UE 110 may then return to Step 2.

Step 5: If the measured quality is larger than a threshold, UE 110 continues reception.

Step 6: If the channel TTI or specified repetition number from higher layer is reached, the UE 110 decodes the channel. If the UE 110 is successful, the channel (e.g., MIB/MIB-NB) acquisition process or channel decoding process is complete. If not, the UE 110 may return to Step 2 and continue the channel reception.

In some embodiments, the UE 110 may decide whether to skip the reception/processing of the channel in a given TTI or to continue its reception based on channel conditions. An exemplary metric for defining channel conditions is an estimated signal quality (Q) of signals received from a cell 125 whose broadcast channel is to be received. Examples of Q include, but are not limited to, SNR, SINR, RSRQ, BLER, among others. The Q may be estimated on a signal of the broadcast channel and/or any other reference signal (e.g., CRS, PRS, etc.).

The UE 110 may compare Q with a signal quality threshold (Qh). Based the comparison, the UE 110 may decide whether or not to decode the broadcast channel in the current TTI of the broadcast channel. For example, if Q>Qh then the UE 110 may continue receiving and decoding the broadcast channel in that TTI. But if Q$\leq$Qh then the UE 110 may decide not to receive the broadcast channel in that TTI.

The UE 100 may use one or more additional criteria to decide how frequently the UE 110 can attempt to skip the reception of the broadcast channel within the broadcast reception period (T0). In certain embodiments, the UE 110 may adapt the signal quality threshold and/or the frequency with which it may decide to receive the broadcast channel every T1. The one or more additional criteria may be any suitable criteria. Examples of the criteria include, but are not limited to:

UE 110 battery life. For example, if the UE 110 battery is below a threshold (e.g., 10%, 20%, 50%) then the UE 110 may set a higher value of Qh in order to make sure that the decoding is successful with higher probability;

Target quality of the channel reception (e.g., broadcast channel reception);

Time period (T0) during which the UE 110 is required to successfully receive the broadcast channel. T0 can be pre-defined or configured by the network node as a requirement (e.g., broadcast acquisition time, MIB decoding time period, etc.).

Type of operation. The broadcast channel may be acquired for different applications by the UE 110. Examples of applications include, but are not limited to, a cell change, an initial cell selection, paging reception, cell reselection, RRC re-establishment, RRC connection release with redirection, a cell global identifier (CGI) reading, or any other suitable application. The UE 110 may adapt the frequency of attempting to decode the broadcast channel (e.g., by setting Qh) based on the type of operation for which the channel is to be decoded. For instance, certain operation may be more time critical and/or may require the UE to acquire the channel with higher reliability (e.g., lower BLER). In case the operation is more time critical, then the UE may set Qh to a lower value. In case the operation involved higher reliability, then the UE may set Qh to a higher value.

Although the various embodiments described herein may be described in terms of broadcast channel. However, the embodiments are applicable for any type of DL channel that is transmitted with at least two repetitions (e.g., any of physical channels such as PDSCH, NPDSCH, MPDCCH, NPDCCH transmitted with 2 or more repetitions, etc.).

To further explain effective MIB acquisition for a UE 110, various steps will now be described in more detail. The embodiments described in these steps are illustrative and not limiting. Moreover, an embodiment may omit certain steps or perform additional steps.

Step 1—Obtain/Receive a Request to Receive a Broadcast Channel

At step 1, the UE 110 may receive a request to perform one or more operations related to a channel (e.g., a broadcast channel) within a time period comprising at least two TTIs of the channel. The operations related to the channel may include one or more of: receiving one or more of information, data, and control information over the channel; acquiring a cell global identifier (CGI); acquiring a master information block (MIB); acquiring a master information block narrowband (MIB-NB); acquiring a broadcast channel of a target cell during a cell change procedure; and acquiring a broadcast channel of a serving cell.

For instance, the UE 110 lower layer processing unit may receive a request to receive the broadcast channel of a cell 125 within a certain time period (T0) comprising at least two TTIs of the broadcast channel. The request may be for any suitable purpose and may be received at any suitable time from any suitable source. As one example, UE 110 may receive a request from the network node 115 to acquire a new cell global identifier (CGI). In some embodiments the CGI is at the inter-frequency measurement or intra-frequency measurement. Another example is when the UE 110 is powered on or returns from a long sleep mode and the UE 110 needs to access to the network 100. In this time, the UE 110 may first decode PSS/SSS or NPSS/NSSS to synchronize with the network 100 and may then receive a request internally through higher layer to acquire MIB or MIB-NB. In yet another example, the UE 110 may acquire the broadcast channel of a target cell 125 during a cell change procedure (e.g., cell reselection to the target cell, RRC connection release with redirection, RRC re-establishment etc.). In yet another example, the UE 110 may acquire the broadcast channel of a serving cell 125 if there is any change in the content of the serving cell 125; the UE 110 may receive a notification on a paging channel to read the system information of the serving cell 125. In some embodiments the request may be an internal request received in the UE 110 through a higher layer. In some embodiments, the request may be an external request received from the network node 115.

Additionally or alternatively, the UE 110 may receive a request to receive a DL channel such as a data channel (e.g., PDSCH, NPDSCH) and/or control channel (e.g., PDCCH, MPDCCH, NPDCCH). The UE 110 may receive such request in any suitable format. For example, the request may be in the form of a scheduling grant, e.g., the UE 110 may receive downlink control information (DCI) on the PDCCH. Accordingly, in certain embodiments the UE 110 may receive an external request that includes DCI received from the network node 115 and the DCI may include the scheduling grant. In some embodiments, the request may be periodic triggering in the lower layer of the UE.

Step 2—Receive a Broadcast Channel

At step 2, the UE 110 may receive one or more symbols at the start of a first TTI of a channel. For instance, the UE 110 may start to receive the PBCH/NPBCH symbols at the MIB/MIB-NB TTI start timing of the channel. The first transmission of the MIB may be scheduled in subframe #0 of radio frames for which the SFN mod 4=0, and if the network supports PBCH repetition for MTC devices, for a TDD/FDD system with a bandwidth larger than 1.4 MHz, MIB transmission is repeated in subframe #9 of the previous radio frame for FDD and subframe #5 of the same radio frame for TDD. For MIB-NB, the first transmission is scheduled in subframe #0 of radio frames for which the SFN mod 64=0.

When the UE 110 is requested to acquire MIB/MIB-NB, the UE 110 may allocate the empty memory buffer to store the received PBCH/NPBCH soft symbols. At the PBCH/BPCH transmitted subframes, the UE 110 demodulates the PBCH/NPBCH symbols and stores in the symbol buffer. If UE 110 receives the repeated PBCH/NPBCH symbols, the UE 110 may combine all of the symbols as one received PBCH/NPBCH symbol, for example, summing all the symbols or making a weighted sum of all the symbols.

The UE 110 may also receive the DL channel symbols at the start of the control channel specified from the network node 115 or at the start of the DL data channel. These start timings are the start of the repetition period of control or data channels (e.g., MPDCCH, NPDCCH, PDSCH or NPDSCH). The received symbols are stored in memory and are used for combining all the subsequently received symbols.

Step 3—Measure the Quality of the Received Symbols

At step 3, the UE 110 may obtain a signal quality estimate based on at least one of the one or more symbols. For example, the UE 110 may measure the quality (Q) of the received PBCH/NPBCH symbols. The UE 110 may measure the power of the signal (e.g., the average of the absolute value of the received signals). In some embodiments, UE 110 may measure the signal quality of the cell-specific reference signal (CSRS). Other quality factors may also be calculated from other signals, such as reference signals or control channels, including but not limited to SNR, SINR, RSRQ, BLER. The measurement may be processed in parallel with the demodulation of the PBCH/NPBCH symbols. In some embodiments, the UE 110 may measure one or more quality values Q1, Q2, etc.

The UE 110 may also measure the quality (Q) of the received repeatedly transmitted control/data channels (e.g., MPDCCH, NPDCCH, PDSCH, NPDSCH). For example, the UE 110 may measure the power of the signal (e.g., the average of the absolute value of the received signals). Other quality factors may also be calculated from other signals such as reference signals or control channels, including but not limited to SNR, SINR, RSRQ, BLER. This measurement may be processed in parallel with the demodulation of the data/control channel symbols (e.g., MPDCCH, NPDCCH, PDSCH, NPDSCH). The UE 110 may measure one or more quality values Q1, Q2, etc.

Step 4—Compare the Measured Quality to a Threshold

At step 4, the UE 110 may compare the qualities Q measured in Step 3 with threshold(s) (Qh). In certain embodiments, this comparison is executed every time, T1. This comparison period, T1, may depend on the measured environment or channel type. Non-exclusive examples of T1 may be 10 ms for PBCH or 80 ms for NPBCH. If the quality value Q is lower than (or equal) to a threshold Qh, for example, Q≤Qh, then the UE 110 may determine the PBCH/NPBCH decoding in this TTI will be failed (or is likely to fail) and stops the PBCH/NPBCH reception until the start of the next PBCH/NPBCH start timing.

In some embodiments, the UE 110 may also compare the qualities Q measured in Step 3 for control/data decoding described above with thresholds (Qh). In certain embodiments, this comparison is executed every time, T1. This comparison period depends on the measured environment or channel type. Non-exclusive examples of T1 may be 20 ms for NPDCCH/NPDSCH or 10 ms for MPDCCH/PDSCH. If the quality value Q is lower than (or equal) to a threshold Qh, for example, Q≤Qh, then the UE determines the control/data decoding in this transmission will be failed and stops the MPDCCH/PDSCH reception/processing until the next start time for control channel transmission.

The comparison can be performed in any suitable manner. As one example, the comparison is simply Q≤Qh. If the UE measures several quality values, the comparison could be performed with: Q1≤Qh1 and Q2≤Qh2 and . . . Qn≤Qhn. As another example, one possibility is to use a combined function, such as: F(Q1, Q2, . . . )≤Qh.

In some embodiments, if the quality value Q is lower than (or equal) to a threshold Qh the UE 110 could turn off its RF receiver and unnecessary digital baseband unit to save the battery until the next MIB/MIB-NB TTI start timing or next control channel start time.

Step 5—Compare the Measured Quality to a Threshold

At step 5, the UE 110 compares the measured qualities Q in Step 3 with thresholds (Qh) during PBCH/NBPCH reception. If the quality value Q is larger than a threshold Qh (e.g., Q>Qh), then the UE 110 may determine that the PBCH/NPBCH decoding is possibly successful. In this embodiment, the UE 110 continues to receive the PBCH/NPBCH symbols and store in the received symbol data buffer.

In some embodiments, the UE may also compare the qualities Q measured in Step 3 with thresholds (Qh) during the control/data channel reception (e.g., NPDCCH, MPDCC, NPDSCH, PDSCH). If the quality value Q is larger a threshold Qh, for example, Q>Qh then the UE 110 determines that the control/data channel decoding is possibly successful. In this case, the UE 110 continues to receive the control/data channel symbols and store in the received symbol data buffer.

The comparison can be performed in any suitable manner. As one example, the comparison is simply whether Q>Qh. If the UE 110 measures several quality values, the comparison would be performed with: Q1>Qh1 and Q2>Qh2 and . . . Qn>Qhn. As another example, one possibility to use a combined function, such as: F(Q1, Q2, . . . )>Qh.

Although steps 4 and 5 have been described as separate steps, steps 4 and 5 may be performed as a single step. For instance, the UE 110 may perform one comparison of Q and Qh to determine whether Q>Qh or whether Q≤Qh. Moreover, although the above comparisons have made on the basis of whether Q is greater than Qh or lower than or equal to Qh, in some embodiments the comparison may be whether Q is greater than or equal to Qh or lower than Qh.

Step 6—Make a Determination (e.g., Decode the Channel)

At step 6, the UE 110 may determine, based on the comparison of Q and Qh, whether to process the channel in the first TTI. In some embodiments, the UE 110 may decode PBCH/NPBCH when the PBCH/NPBCH TTI is reached. If it is successful, the MIB/MIB-NB acquisition process is complete. If it is not successful, the UE 110 may clear the PBCH/NPBCH data buffer and start to receive PBCH/NPBCH from the next PBCH/NPBCH TTI start time.

Processing the channel may include any suitable processing steps. For example, the UE 110 may decode the channel, may continue reception of the channel, may store the received symbol data in a buffer, may acquire a MIB; and/or may acquire a MIB-NB.

In some cases, the UE 110 may also decode control/data channel (e.g., NPDCCH, NPDSCH, MPDCCH, and PDSCH) when the scheduled repeated control/data channel symbols are received. For the control channel (e.g., NPDCCH, MPDCCH), if the maximum repetition number is not reached, the UE 110 may return to Step 2 described above and continue to receive the control channel symbols. For the control channel, when the maximum repetition number is reached, the UE 110 may complete the control channel decoding process regardless of the decoding result. For the data channel (for example, NPDSCH, PDSCH), when the maximum repetition number is reached, the UE 110 may complete the data channel control regardless of the decoding results.

In some embodiments, the UE 110 may process the channel in the first TTI if the signal quality estimate is greater than the signal quality threshold and skip processing the channel in the first TTI if the signal quality estimate is lower than the signal quality threshold.

In some embodiments, the UE 110 may update the database for thresholds for qualities comparison such as Qh. For example, if the UE 110 fails the decoding of PBCH/NPBCH many times even though the comparison criteria in Step 5 is met, the UE 110 may decrease the threshold so that the UE skips future unlikely PBCH/NPBCH decoding. As another example, the UE 110 may decrease the threshold so that the UE 110 skips the likely unsuccessful control/data channel decoding if the UE 110 fails the decoding of control/data channel many times—even if the comparison criteria in Step 5 are met.

Figure 4:
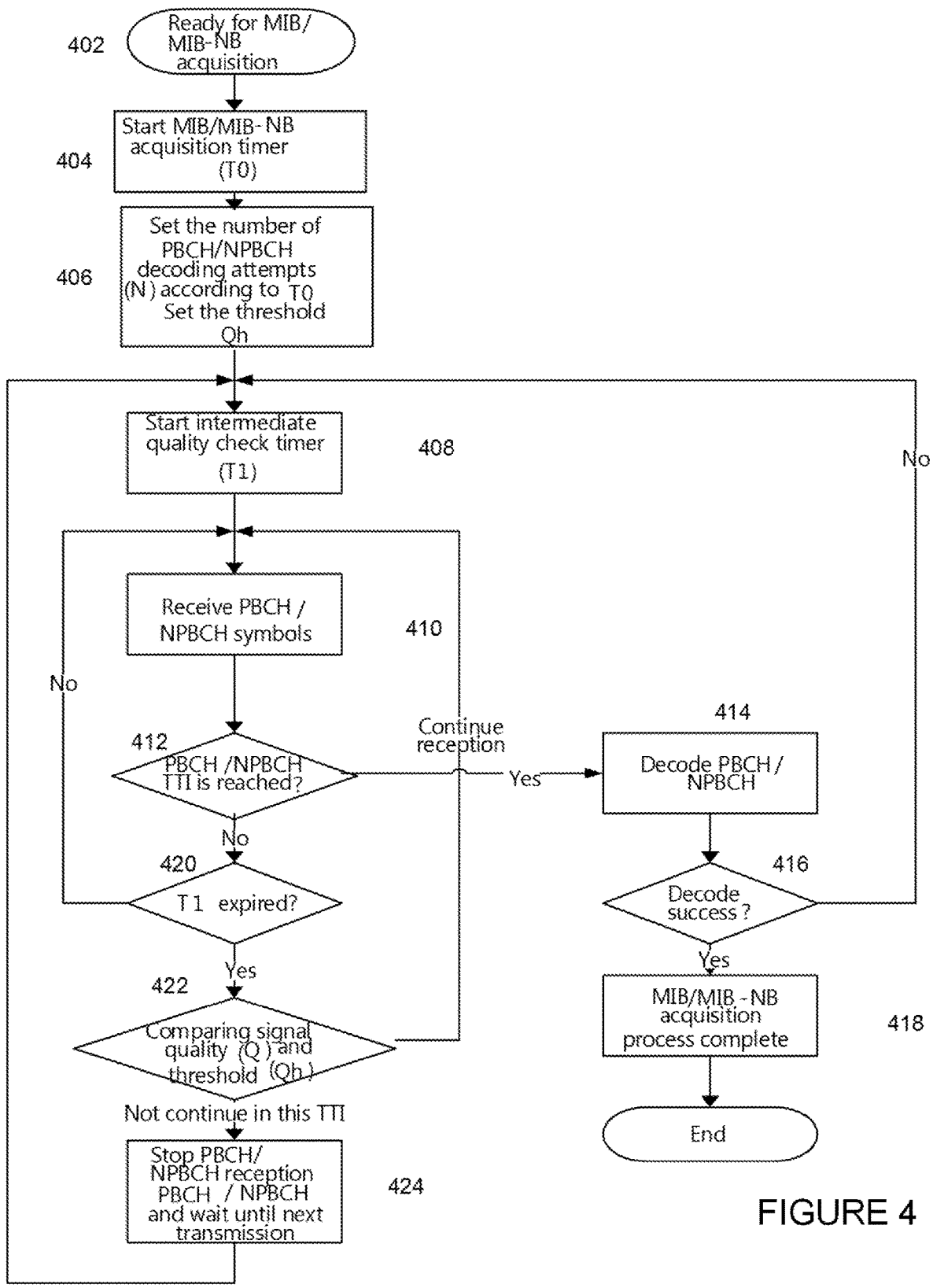
FIG. 4 is a flow diagram of a method in a user equipment, in accordance with certain embodiments.
Figure 5:
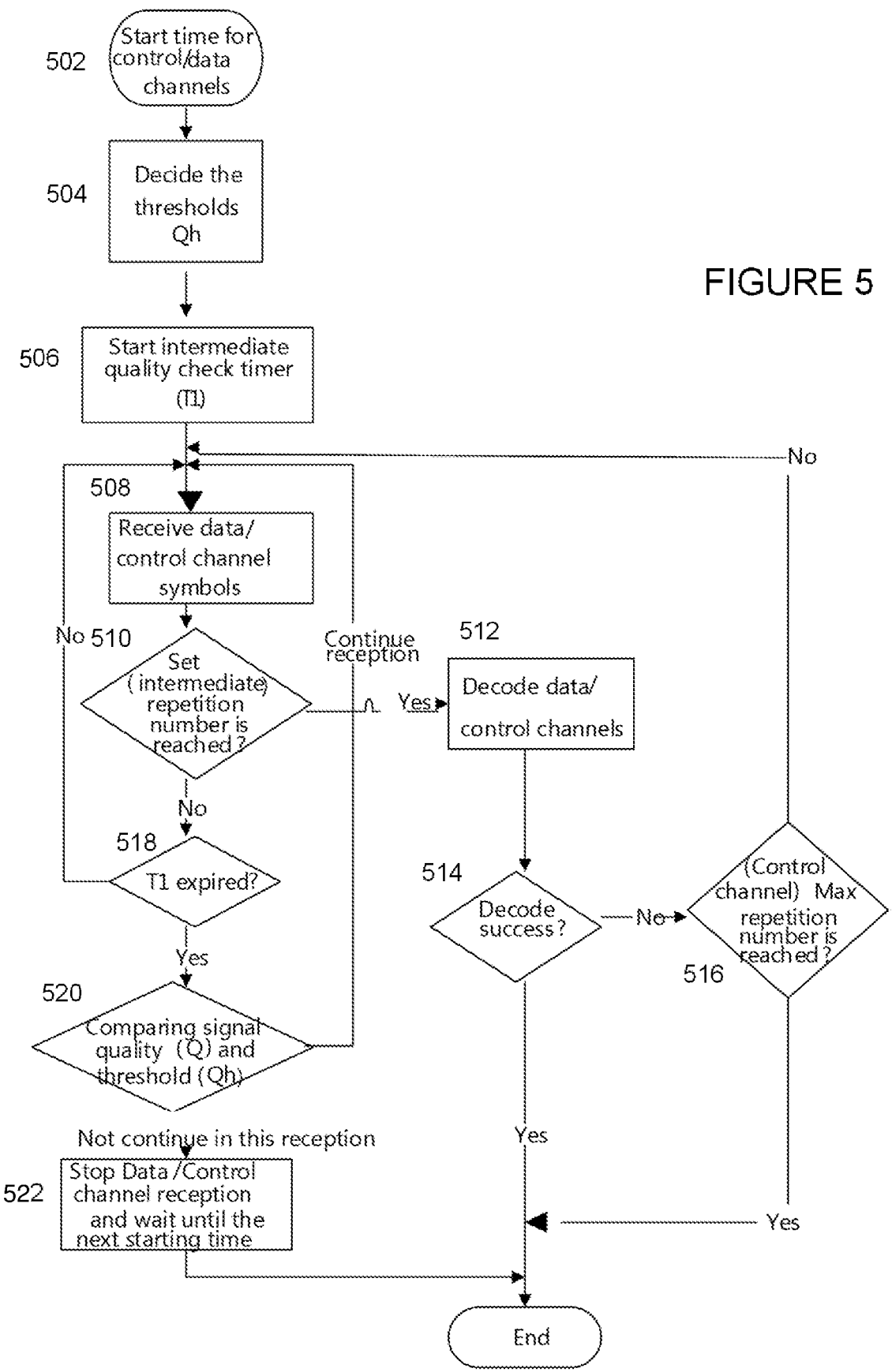
FIG. 5 is a flow diagram of method in a user equipment, in accordance with certain embodiments.

The foregoing descriptions are merely examples of various embodiments and are not limiting. FIGS. 4 and 5 provide additional example embodiments. For example, FIG. 4 describes embodiments for effective MIB/MIB-NB acquisition. FIG. 5 describes how embodiments of the present disclosure may be extended to data/control channels that use repeated transmissions (e.g., PDSCH, NPDSCH, MPDCCH, NPDCC).

FIG. 4 is a flow diagram of a method in a UE 110, in accordance with certain embodiments. The method begins at step 402, where the UE 110 is ready for MIB/MIB-NB acquisition. At step 404, the UE 110 starts an MIB/MIB-NB acquisition timer, T0. At step 406, the UE 110 may set the number of PBCH/NPBCH decoding attempts (N) according to T0, and set the threshold Qh.

At step 408, the UE starts an intermediate quality check timer, T1. At step 410, the UE 110 receives PBCH/NPBCH symbols. For example, the UE 110 may receive one or more symbols at the start of a first TTI of the channel. In certain embodiments, the UE 110 may obtain a signal quality estimate (Q) based on the one or more received symbols. At step 412, the UE 110 determines whether the PBCH/NPBCH TTI is reached.

If at step 412 the UE 110 determines that the PBCH/NPBCH TTI is reached, the method proceeds to step 414 where the UE 110 decodes PBCH/NPBCH. At step 416, the UE 110 determines whether the decoding of PBCH/NPBCH was a success. If the UE 110 determines that the decoding of PBCH/NPBCH was a success, then the method proceeds to step 418 and the MIB/MIB-NB acquisition process is completed. If the UE 110 determines that the decoding of PBCH/NPBCH was not a success, then the method returns to step 408 and the UE 110 starts the intermediate quality check timer T1.

If at step 412 the UE 110 determines that the PBCH/NPBCH transmission time interval is not reached, the method proceeds to step 420. At step 420, the UE 110 determines whether T1 has expired.

If at step 420 the UE determines that T1 has not expired, the method returns to step 410 and the UE receives PBCH/NPBCH symbols. If at step 420 the UE 110 determines that T1 has expired, the method proceeds to step 422. At step 422, the UE 110 may compare the signal quality (Q) to a signal quality threshold (Qh) and determine, based on the comparison, whether to process the channel in the first TTI.

In certain embodiments, the UE 110 compares the signal quality (Q) and the threshold (Qh) to see if the signal quality is above a threshold. If at step 422 the UE 110 determines that the signal quality is above the threshold, then the method returns to step 410 and the UE 110 continues to receive PBCH/NPBCH symbols. In certain embodiments, if at step 422, the UE 110 determines that the signal quality estimate (Q) is greater than the signal quality threshold (Qh), the UE 110 may process the channel. If at step 422 the UE 110 determines that the signal quality is below the threshold, then the method proceeds to step 424 and the UE 110 stops PBCH/NPBCH reception and waits until the next PBCH/NPBCH transmission. In certain embodiments, if at step 422 the UE 110 determines that the signal quality (Q) is below the threshold (Qh), then the method may skip processing the channel in the first TTI and wait until the next PBCH/NPBCH transmission. The method then returns to step 408, where the UE 110 starts the intermediate quality check timer T1.

FIG. 5 is a flow diagram of method in a UE 110, in accordance with certain embodiments. More particularly, FIG. 5 illustrates an example method in which the various embodiments described herein have been extended to data/control channels supporting repeated transmission.

The method begins at step 502 at the UE 110 start time for data/control channels. At step 504, the UE 110 decides the threshold Qh. At step 506, the UE 110 starts an intermediate quality check timer (T1). At step 508, the UE 110 receives data/control channel symbols. For example, the UE 110 may receive one or more symbols at the start of a first TTI of the channel. In certain embodiments, the UE 110 may obtain a signal quality estimate (Q) based on the one or more received data/control channel symbols. At step 510, the UE 110 determines whether the set (intermediate) repetition number has been reached.

If at step 510 the UE 110 determines that the set (intermediate) repetition number has been reached, the method proceeds to step 512. At step 512, the UE 110 decodes the data/control channels. At step 514, the UE 110 determines whether the data/control channels were successfully decoded. If at step 514 the UE 110 determines that the data/control channels were successfully decoded, the method ends. If at step 514 the UE 110 determines that the data/control channels were not successfully decoded, the method proceeds to step 516, where the UE 110 determines whether the (control channel) max repetition number has been reached. If at step 516 the UE 110 determines that the max repetition number has been reached, then the method ends. If at step 516, the UE 110 determines that the max repetition number has not been reached, then the method returns to step 508 and the UE 110 continues receiving data/control channel symbols.

If at step 510 the UE 110 determines that the set (intermediate) repetition number has not been reached, then the method proceeds to step 518. At step 518, the UE 110 determines whether the intermediate quality check timer T1 has expired. If at step 518 the UE 110 determines that the intermediate quality check timer T1 has not expired, then the method returns to step 508 and the UE 110 continues receiving data/control channel symbols. If at step 518 the UE 110 determines that the intermediate quality check timer T1 has expired, the method proceeds to step 520.

At step 520, the UE 110 compares the signal quality (Q) to the threshold (Qh) and determine, based on the comparison, whether to process the channel in the TTI. If at step 520 the UE 110 determines that the signal quality (Q) is above the threshold (Qh), then the method returns to step 508 and the UE 110 continues to receive PBCH/NPBCH symbols. In certain embodiments, if at step 520, the UE 110 determines that the signal quality estimate (Q) is greater than the signal quality threshold (Qh), the UE 110 may process the data/control channel. If at step 520 the UE 110 determines that the signal quality is below the threshold, then the method proceeds to step 522 and the UE 110 stops data/control channel reception and waits until the next starting time. In certain embodiments, if at step 520 the UE 110 determines that the signal quality (Q) is below the threshold (Qh), then the method may skip processing the data/control channel in the first TTI and wait until the next data/control transmission.

Figure 6:
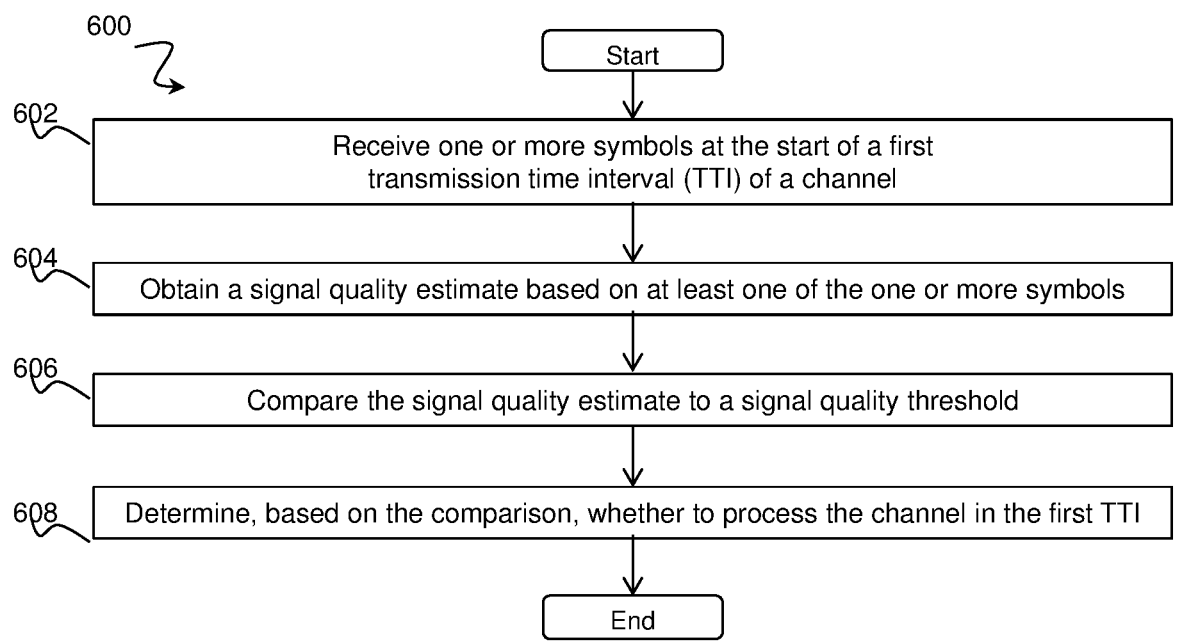
FIG. 6 is a flow diagram of a method in a user equipment, in accordance with certain embodiments.

FIG. 6 is a flow diagram of a method in the UE 110, in accordance with certain embodiments. The method begins at step 602, where the UE receives one or more symbols at the start of a first TTI of a channel. In certain cases, the channel may be a broadcast channel such as PBCH/NPBCH. For example, the UE 110 may receive PBCH symbols at the MIB TTI start time of the channel. In some embodiments, the channel may be data channel such as PDSCH or NPDSCH. In other embodiments, the channel may be a control channel such as PDCCH, MPDCCH, or NPDCCH.

At step 604, the UE 110 obtains a signal quality estimate based on at least one of the one or more symbols. Any suitable signal quality estimate may be used. For instance, the UE 110 may measure the quality (Q) of received PBCH/NPBCH symbols. In some embodiments, the UE 110 may measure the quality (Q) of the received repeatedly transmitted control/data channels (e.g., MPDCCH, NPDCCH, PDSCH, NPDSCH). The UE 110 may measure the power of the signal (e.g., the average of the absolute value of the received signals). Other quality factors may also be calculated from other signals, such as reference signals or control channels, including but not limited to SNR, SINR, RSRQ, BLER.

At step 606, the UE 110 may compare the signal quality estimate (Q) to a signal quality threshold (Qh). The quality threshold applied by the UE 110 may be based on any suitable benchmarks, including but not limited to: UE 110 battery life; a target quality of the channel reception; a time period during which the UE 110 is required to successfully receive the channel; and/or a type of operation (e.g., paging reception, cell reselection, RRC re-establishment, among others).

At step 608, the UE 110 may determine based on the comparison, whether to process the channel in the first TTI. For instance, if the quality measurement (Q) is greater than the quality threshold (Qh), the UE 110 may determine that it should continue to decode the channel and continue receiving the one or more symbols. If the quality measurement (Q) is lower than or equal to the quality threshold (Qh), the UE 110 may determine that it should not continue decoding the channel and cease receiving and/or storing the one or more symbols. In this manner, the UE 110 may conserve resources by making informed determinations on when to stop reception of the channel. Although FIG. 6 is illustrated with steps 602, 604, 606, and 608, any suitable number of steps may be used. In some embodiments, certain steps may be repeated or omitted.

Figure 7:
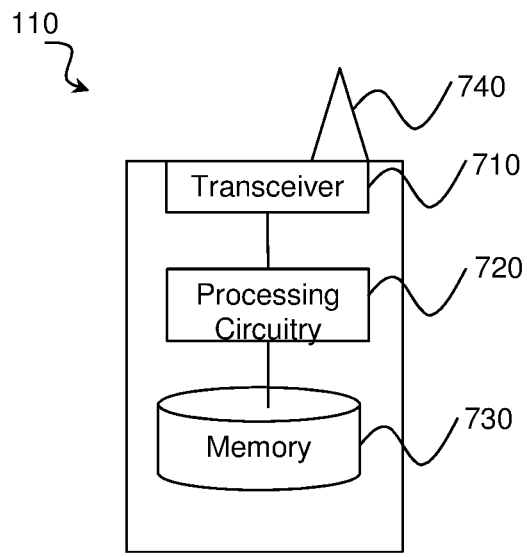
FIG. 7 is a block schematic of an exemplary user equipment, in accordance with certain embodiments.

FIG. 7 is a block schematic of an exemplary UE 110, in accordance with certain embodiments. UE 110 may refer to any type of wireless device communicating with a node and/or with another wireless device in a cellular or mobile communication system. Examples of UE 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A UE 110 may also be referred to as UE 110, a station (STA), a device, or a terminal in some embodiments. UE 110 includes transceiver 710, processing circuitry 720, and memory 730. In some embodiments, transceiver 710 facilitates transmitting wireless signals to and receiving wireless signals from network node 115 (e.g., via antenna 740), processing circuitry 720 executes instructions to provide some or all of the functionality described above as being provided by UE 110, and memory 730 stores the instructions executed by processing circuitry 720.

Processing circuitry 720 may include any suitable combination of hardware and software implemented in one or more modules to execute instructions and manipulate data to perform some or all of the described functions of UE 110, such as the functions of UE 110 described above in relation to FIGS. 1-6. In some embodiments, processing circuitry 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 720.

Other embodiments of UE 110 may include additional components beyond those shown in FIG. 7 that may be responsible for providing certain aspects of the wireless device's functionality, including any of the functionality described above and/or any additional functionality (including any functionality necessary to support the embodiments described above). As just one example, UE 110 may include input devices and circuits, output devices, and one or more synchronization units or circuits, which may be part of the processing circuitry 720. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
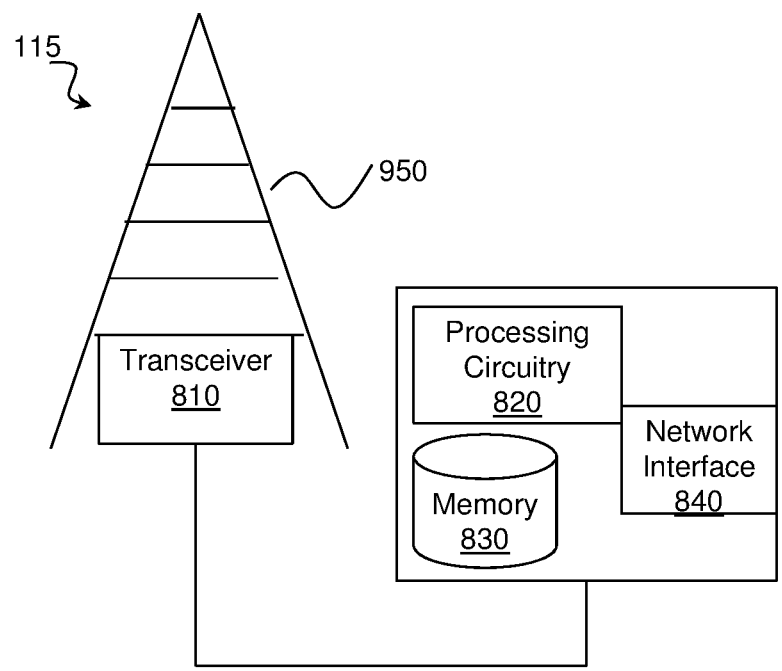
FIG. 8 is a block schematic of an exemplary network node, in accordance with certain embodiments.

FIG. 8 is a block schematic of an exemplary network node 115, in accordance with certain embodiments. Network node 115 may be any type of radio network node or any network node that communicates with a UE 110 and/or with another network node. Examples of network node 115 include an eNodeB, gNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processing circuitry 820, memory 830, and network interface 840. In some embodiments, transceiver 810 facilitates transmitting wireless signals to and receiving wireless signals from UE 110 (e.g., via antenna 950), processing circuitry 820 executes instructions to provide some or all of the functionality described above as being provided by a network node 115, memory 830 stores the instructions executed by processing circuitry 820, and network interface 840 communicates signals to backend network components, such as a gateway, switch, router, Internet, Public Switched Telephone Network (PSTN), core network nodes or radio network controllers 130, etc.

Processing circuitry 820 may include any suitable combination of hardware and software implemented in one or more modules to execute instructions and manipulate data to perform some or all of the described functions of network node 115, such as those described above in relation to FIGS.

1-6 above. In some embodiments, processing circuitry 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processing circuitry 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
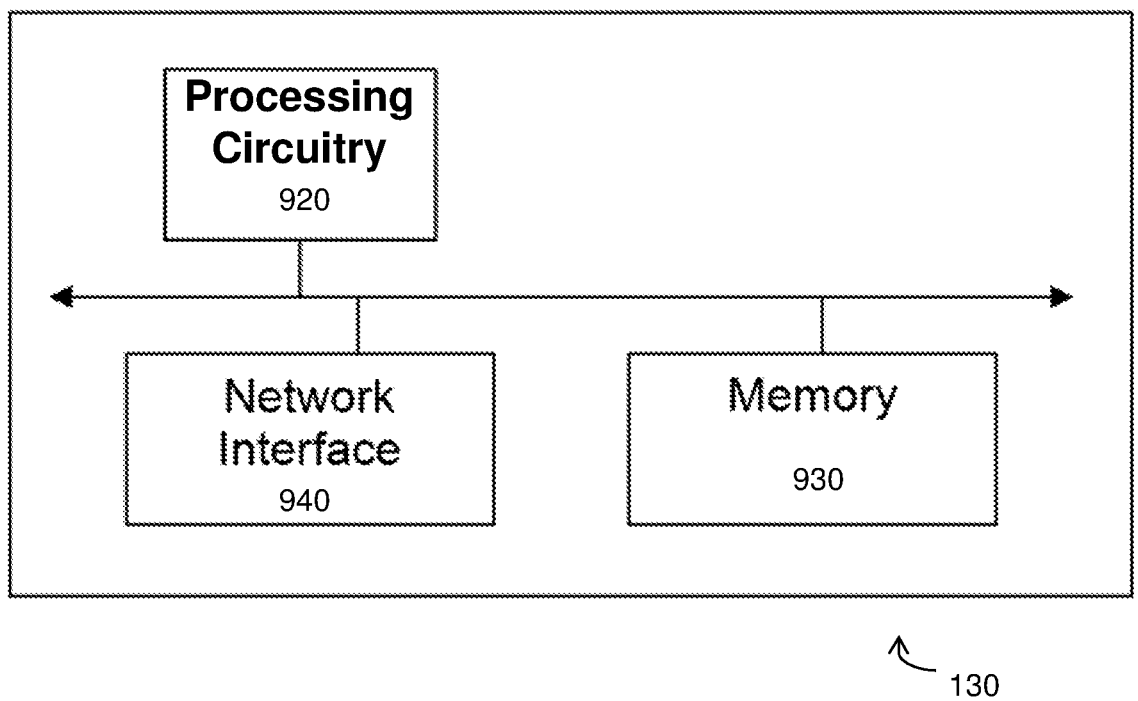
FIG. 9 is a block schematic of an exemplary radio network controller or core network node, in accordance with certain embodiments.

FIG. 9 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 920, memory 930, and network interface 940. In some embodiments, processing circuitry 920 executes instructions to provide some or all of the functionality described above as being provided by the network node, memory 930 stores the instructions executed by processing circuitry 920, and network interface 940 communicates signals to any suitable node, such as a gateway, switch, router, Internet, Public Switched Telephone Network (PSTN), network nodes 115, radio network controllers or core network nodes 130, etc.

Processing circuitry 920 may include any suitable combination of hardware and software implemented in one or more modules to execute instructions and manipulate data to perform some or all of the described functions of the radio network controller or core network node 130. In some embodiments, processing circuitry 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processing circuitry 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Figure 10:
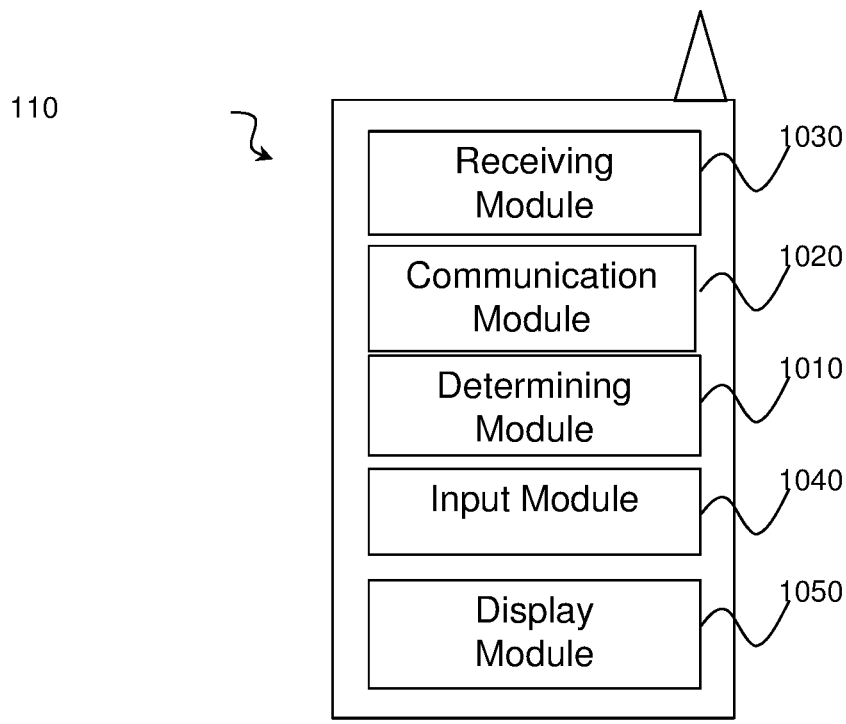
FIG. 10 is a block schematic of an exemplary user equipment, in accordance with certain embodiments.

FIG. 10 is a block schematic of an exemplary UE 110, in accordance with certain embodiments. UE 110 may include one or more modules. For example, UE 110 may include a determining module 1010, a communication module 1020, a receiving module 1030, an input module 1040, a display module 1050, and any other suitable modules. UE 110 may perform the methods for effective MIB acquisition for MTC devices described above with respect to FIGS. 1-6.

Determining module 1010 may perform the processing functions of UE 110. For example, determining module 1010 may obtain a signal quality estimate (Q) based on at least one or more symbols received during a first TTI of a channel. Determining module 1010 may compare the signal quality estimate (Q) to a signal quality threshold (Qh) and determine, based on the comparison, whether to process the channel in the first TTI (e.g., a broadcast channel). In some embodiments, if the signal quality estimate (Q) is greater than the signal quality threshold (Qh), determining module 1010 may process the channel in the first TTI. And, if the signal quality estimate (Q) is lower than the signal quality threshold (Qh), determining module may skip processing the channel in the first TTI Determining module 1010 may include or be included in one or more processors, such as processing circuitry 720 described above in relation to FIG. 7. Determining module 1010 may include analog and/or digital circuitry configured to perform any of the functions of determining module 1010 and/or processing circuitry 720 described above. The functions of determining module 1010 described above may, in certain embodiments, be performed in one or more distinct modules.

Communication module 1020 may perform the transmission functions of UE 110. Communication module 1020 may transmit messages to one or more of network nodes 115 of network 100. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010. In certain embodiments, the functions of communication module 1020 described above may be performed in one or more distinct modules.

Receiving module 1030 may perform the receiving functions of UE 110. For example, receiving module 1030 may receive one or more symbols at the start of a TTI of a channel. As another example, receiving module 1030 may receive a request to perform one or more operations related to the channel within a time period, the time period comprising at least two TTIs of the channel. As another example, receiving module 1030 may start receiving the channel from the start of a first TTI of the channel in the cell. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010.

Input module 1040 may receive user input intended for UE 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010.

Display module 1050 may present signals on a display of UE 110. Display module 1050 may include the display and/or any appropriate circuitry and hardware configured to present signals on the display. Display module 1050 may receive signals to present on the display from determining module 1010.

Determining module 1010, communication module 1020, receiving module 1030, input module 1040, and display module 1050 may include any suitable configuration of hardware and/or software. UE 110 may include additional modules beyond those shown in FIG. 10 that may be responsible for providing any suitable functionality, including any of the functionality described above and/or any additional functionality (including any functionality necessary to support the various solutions described herein).

Figure 11:
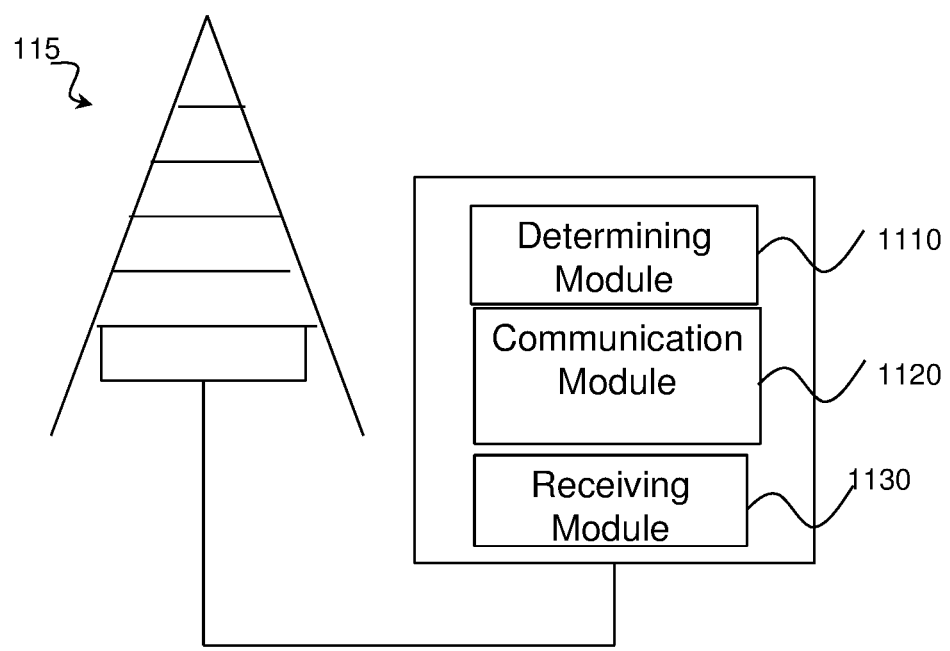
FIG. 11 is a block schematic of an exemplary network node, in accordance with certain embodiments.

FIG. 11 is a block schematic of an exemplary network node 115, in accordance with certain embodiments. Network node 115 may include one or more modules. For example, network node 115 may include determining module 1110, communication module 1120, receiving module 1130, and any other suitable modules. In some embodiments, one or more of determining module 1110, communication module 1120, receiving module 1130, or any other suitable module may be implemented using one or more processors, such as processing circuitry 820 described above in relation to FIG. 8. In certain embodiments, the functions of two or more of the various modules may be combined into a single module. Network node 115 may perform the methods for effective MIB acquisition for MTC devices described above with respect to FIGS. 1-6.

Determining module 1110 may perform the processing functions of network node 115. Determining module 1110 may include or be included in one or more processors, such as processing circuitry 820 described above in relation to FIG. 8. Determining module 1110 may include analog and/or digital circuitry configured to perform any of the functions of determining module 1110 and/or processing circuitry 820 described above. The functions of determining module 1110 may, in certain embodiments, be performed in one or more distinct modules. For example, in certain embodiments some of the functionality of determining module 1110 may be performed by an allocation module.

Communication module 1120 may perform the transmission functions of network node 115. Communication module 1120 may transmit messages to one or more of wireless devices 110. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110 or any other module.

Receiving module 1130 may perform the receiving functions of network node 115. Receiving module 1130 may receive any suitable information from a wireless device. Receiving module 1130 may include a receiver and/or a transceiver, such as transceiver 810 described above in relation to FIG. 8. Receiving module 1130 may include circuitry configured to wirelessly receive messages and/or signals. In particular embodiments, receiving module 1130 may communicate received messages and/or signals to determining module 1110 or any other suitable module.

Determining module 1110, communication module 1120, and receiving module 1130 may include any suitable configuration of hardware and/or software. Network node 115 may include additional modules beyond those shown in FIG. 11 that may be responsible for providing any suitable functionality, including any of the functionality described above and/or any additional functionality (including any functionality necessary to support the various solutions described herein).

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations Used in the Preceding Description Include:

| Abbreviation | Description |
| --- | --- |
| 3GPP | The 3rd Generation Partnership Project |
| AP | Access Point |
| BLER | Block Error Rate |
| BS | Base Station |
| BSC | Base Station Controller |
| BTS | Base Transceiver Station |
| CDM | Code Division Multiplexing |
| CGI | Cell Global Identifier |
| CPE | Customer Premises Equipment |
| CRS | Common Reference Signal (Cell-Specific Reference Signal) |
| CQI | Channel Quality Indicator |
| CSI-RS | Channel State Information Reference Signal |
| D2D | Device-to-device |
| DAS | Distributed Antenna System |
| DCI | Downlink Control Information |
| DFT | Discrete Fourier Transform |
| DL | Downlink |
| DMRS | Demodulation Reference Signal |
| eMTC | Enhancement of Machine-Type Communications |
| eNB | evolved Node B |
| EPDCCH | Enhanced Physical Downlink Control Channel |
| E-UTRA | Evolved Universal Terrestrial Radio Access |
| FDD | Frequency Division Duplex |
| LAN | Local Area Network |
| LEE | Laptop Embedded Equipment |

-continued

| Abbreviation | Description |
| --- | --- |
| LME | Laptop Mounted Equipment |
| LTE | Long Term Evolution |
| M2M | Machine-to-Machine |
| MAN | Metropolitan Area Network |
| MCE | Multi-cell/multicast Coordination Entity |
| MCS | Modulation level and coding scheme |
| MIB | Master Information Block |
| MIB-NB | Master Information Block Narrowband |
| MSR | Multi-standard Radio |
| MTC | Machine-Type Communications |
| NAS | Non-Access Stratum |
| NB-IoT | Narrow Band Internet of Things |
| OFDM | Orthogonal Frequency Division Multiplexing |
| PBCH | Physical Broadcast Channel |
| PDCCH | Physical Downlink Control Channel |
| PDSCH | Physical Downlink Shared Channel |
| PMI | Precoded Matrix Indicator |
| PRB | Physical Resource Block |
| PRS | Positioning Reference Signal |
| PSS | Primary Synchronization Symbol |
| PSTN | Public Switched Telephone Network |
| PUSCH | Physical Uplink Shared Channel |
| PUCCH | Physical Uplink Control Channel |
| RB | Resource Block |
| RI | Rank Indicator |
| RNC | Radio Network Controller |
| RRC | Radio Resource Control |
| RRH | Remote Radio Head |
| RRU | Remote Radio Unit |
| RSRP | Reference Signal Received Power |
| RSRQ | Reference Signal Received Quality |
| SFN | System Frame Number |
| SIB | System Information Block |
| SINR | Signal-to-Interference plus Noise Ratio |
| SNR | Signal-to-Noise Ratio |
| SSS | Secondary Synchronization Symbol |
| TDD | Time Division Duplex |
| TFRE | Time Frequency Resource Element |
| TTI | Transmission Time Interval |
| UE | User Equipment |
| UL | Uplink |
| WAN | Wide Area Network |

The invention claimed is:

1. A method for use in a user equipment (UE), comprising:
receiving one or more symbols at the start of a first transmission time interval (TTI) of a channel;
obtaining a signal quality estimate based on at least one of the one or more symbols;
comparing the signal quality estimate to a signal quality threshold; and
determining, based on the comparison, whether to continue a reception of the channel in the first TTI;
in response to determining, based on the comparison, to continue the reception of the channel in the first TTI, processing the channel in the first TTI;
in response to determining, based on the comparison, not to continue the reception of the channel in the first TTI:
waiting until the next TTI;
receiving one or more second symbols at the start of a second TTI of a channel;
obtaining a second signal quality estimate based on at least one of the one or more second symbols;
comparing the second signal quality estimate to the signal quality threshold; and
determining, based on the comparison, whether to continue a reception of the channel in the second TTI.

2. The method of claim 1, wherein determining, based on the comparison, whether to continue the reception of the channel in the first TTI comprises:
continuing the reception of the channel in the first TTI if the signal quality estimate is greater than the signal quality threshold; and
discontinuing the reception of the channel in the first TTI if the signal quality estimate is lower than the signal quality threshold.

3. The method of claim 1, wherein the channel is a broadcast channel.

4. The method of claim 1, wherein prior to receiving the one or more symbols, the method further comprises:
receiving a request to perform one or more operations related to the channel within a time period, the time period comprising at least two TT's of the channel.

5. The method of claim 4, wherein the one or more operations related to the channel comprise one or more of:
receiving one or more of information, data, and control information over the channel;
acquiring a cell global identifier (CGI);
acquiring a master information block (MIB);
acquiring a master information block narrowband (MIB-NB);
acquiring a broadcast channel of a target cell during a cell change procedure; and
acquiring a broadcast channel of a serving cell.

6. The method of claim 4, wherein the request to perform one or more operations related to the channel within the time period comprises at least one of:
an internal request received in the UE through a higher layer; and
an external request received from a network node.

7. The method of claim 6, wherein the external request comprises downlink control information (DCI) received from the network node, the DCI comprising a scheduling grant.

8. The method of claim 1, further comprising adapting the signal quality threshold based on one or more of:
a battery life of the UE;
a type of the channel received by the UE;
a time period during which the UE is required to successfully receive the channel; and
a type of operation of the UE.

9. The method of claim 1, wherein the signal quality estimate comprises one of:
a signal-to-noise ratio (SNR),
a signal-to-interference plus noise ratio (SINR),
a reference signal received quality (RSRQ), and
a block error rate (BLER).

10. The method of claim 8, wherein the type of operation of the UE comprises one of:
a cell change;
an initial cell selection;
a paging reception;
a cell reselection;
a radio resource control (RRC) re-establishment;
a RRC connection release with redirection; and
a CGI reading.

11. The method of claim 1, wherein processing the channel comprises at least one of:
decoding the channel;
continuing reception of the channel;
storing the received symbol data in a buffer;
acquiring a MIB; and
acquiring a MIB-NB.

12. The method of claim 1, wherein obtaining a signal quality estimate of the one or more symbols comprises measuring the signal quality of the one or more symbols.

13. A user equipment (UE), comprising:
an interface configured to receive one or more symbols at the start of a first transmission time interval (TTI) of a channel;
processing circuitry operably coupled to the interface, the processing circuitry configured to:
obtain a signal quality estimate based on at least one of the one or more symbols;
compare the signal quality estimate to a signal quality threshold; and
determine, based on the comparison, whether to continue a reception of the channel in the first TTI;
in response to determining, based on the comparison, to continue the reception of the channel in the first TTI, process the channel in the first TTI; and
in response to determining, based on the comparison, not to continue the reception of the channel in the first TTI: wait until the next TTI;
receive one or more second symbols at the start of a second TTI of a channel;
obtain a second signal quality estimate based on at least one of the one or more second symbols;
compare the second signal quality estimate to the signal quality threshold; and
determine, based on the comparison, whether to continue a reception of the channel in the second TTI.

14. The UE of claim 13, wherein to determine, based on the comparison, whether to process the channel in the first TTI, the interface is configured to:
continue the reception of the channel in the first TTI if the signal quality estimate is greater than the signal quality threshold; and
discontinue the reception of the channel in the first TTI if the signal quality estimate is lower than the signal quality threshold.

15. The UE of claim 13, wherein the channel is a broadcast channel.

16. The UE of claim 13, wherein prior to receiving the one or more symbols, the interface is further configured to:
receive a request to perform one or more operations related to the channel within a time period, the time period comprising at least two TT's of the channel.

17. The UE of claim 16, wherein the one or more operations related to the channel comprises one or more of:
receive, via the interface, one or more of information, data, and control information over the channel;
acquire, via the interface, a cell global identifier (CGI);
acquire, via the interface, a master information block (MIB)
acquire, via the interface, a master information block narrowband (MIB-NB);
acquire, via the interface, a broadcast channel of a target cell during a cell change procedure; and
acquire, via the interface, a broadcast channel of a serving cell.

18. The UE of claim 16, wherein the request to perform one or more operations related to the channel within the time period comprises at least one of:
an internal request received in the UE through a higher layer; and
an external request received from a network node.

19. The UE of claim 18, wherein the external request comprises downlink control information (DCI) received from the network node, the DCI comprising a scheduling grant.

20. The UE of claim 13, wherein the processing circuitry is further configured to adapt the signal quality threshold based on one or more of:
a battery life of the UE;
a type of the channel received by the UE;
a time period during which the UE is required to successfully receive the channel; and
a type of operation of the UE.

21. The UE of claim 13, wherein the estimated signal quality comprises one of:
a signal-to-noise ratio (SNR),
a signal-to-interference plus noise ratio (SINR),
a reference signal received quality (RSRQ), and
a block error rate (BLER).

22. The UE of claim 20, wherein the type of operation of the UE comprises one of:
a cell change;
an initial cell selection;
a paging reception;
a cell reselection;
a radio resource control (RRC) re-establishment;
a RRC connection release with redirection; and
a CGI reading.

23. The UE of claim 13, wherein processing the channel comprises at least one of:
decoding the channel;
continuing reception of the channel;
storing the received symbol data in a buffer; and
acquiring a MIB; and
acquiring a MIB-NB.

24. The UE of claim 13, wherein obtaining a signal quality estimate of the one or more symbols comprises measuring the signal quality of the one or more symbols.

* * * * *